United States Patent [19]

Mitsui et al.

[11] Patent Number: 4,921,745
[45] Date of Patent: May 1, 1990

[54] HONEYCOMB STRUCTURE OF AROMATIC POLYIMIDE

[75] Inventors: Kazuhiko Mitsui; Kazuo Kumamoto; Keiichirou Koyashiki, all of Yamaguchi, Japan

[73] Assignee: Ube Industries, Ltd., Yamaguchi, Japan

[21] Appl. No.: 290,461

[22] Filed: Dec. 27, 1988

[30] Foreign Application Priority Data

Dec. 25, 1987 [JP] Japan ................... 62-328904
Mar. 8, 1988 [JP] Japan ................... 63-55805

[51] Int. Cl.$^5$ .............................................. B32B 3/12
[52] U.S. Cl. ................................. 428/118; 52/806; 156/197; 428/473.5
[58] Field of Search ............ 428/116, 117, 118, 473.5, 428/73; 52/806; 156/197

[56] References Cited

U.S. PATENT DOCUMENTS

| 3,811,997 | 5/1974 | Yuan | 428/116 |
| 4,061,812 | 12/1977 | Gilwee, Jr. et al. | 428/117 |
| 4,615,859 | 10/1986 | Traut | 428/116 X |
| 4,659,598 | 4/1987 | Traut | 428/34.5 X |
| 4,767,656 | 8/1988 | Chee et al. | 428/116 |
| 4,789,304 | 12/1988 | Gustafson et al. | 428/117 X |

OTHER PUBLICATIONS

Honeycomb Materials and Applications, an Article by John I. Corden and Thomas N. Bitzer—Hexcel Corp., Dublin, CA.—32nd International SAME Symposium Apr. 6-9, 1987.

Primary Examiner—Henry F. Epstein
Attorney, Agent, or Firm—McAulay, Fisher, Nissen & Goldberg

[57] ABSTRACT

A new honeycomb core structure of heat-resistant aromatic polyimide is disclosed. The structure comprises plural aromatic polyimide sheets wherein adjoining two aromatic polyimide sheets are combined to each other with a heat resistant adhesive at adhesive regions arranged between the two sheets at equal intervals and the adhesive regions on one side of any aromatic polyimide sheet are located at positions shifting from positions of adhesive regions arranged on another side of the sheet. The honeycomb structure is formed by extending the combined aromatic polyimide sheets in the direction vertical to the plane of the polyimide sheets.

9 Claims, 2 Drawing Sheets

HONEYCOMB STRUCTURE OF AROMATIC POLYIMIDE

BACKGROUND OF THE INVENTION

1. Field of the Invention

The present invention relates to a honeycomb structure having high heat resistance. More particularly, the invention relates to a heat-resistant honeycomb core having a sandwich structure, which is favorably employable for the manufacture of airplanes, railway vehicles, automobiles, hovercrafts, architectures, aerospace structures (e.g., satellite, and developable solar cell paddle for satellite), etc.

2. Description of Prior Art

There have been heretofore known various honeycomb structures such as a honeycomb core made of metal foil such as aluminum foil as described in Japanese Patent Publication No. 59(1984)-40621, a honeycomb core made of plastic material such as polyethylene, polypropylene, polyvinyl chloride and polyester as described in Japanese Patent Publication No. 59(1984)-32306 and Japanese Patent Provisional Publications No. 60(1985)-190,340 and No. 60(1985)-245,547, and a honeycomb core made of paper.

However, those known honeycomb cores are insufficient in lightweight property and/or and heat resistance.

An aromatic polyimide is excellent from the viewpoints of lightweight property and heat resistance, but a conventionally known aromatic polyimide in the form of sheet or film hardly shows flexure-deformation property even under heating at elevated temperatures. Further, no adequate adhesive employable for the preparation of a honeycomb core according to a method comprising extending sheets or films has been known. As a result honeycomb comb core of an aromatic polyimide has not been prepared industrially and not used practically.

SUMMARY OF THE INVENTION

It is an object of the present invention to provide a novel honeycomb structure of an aromatic polyimide (i.e., aromatic polyimide honeycomb core) which has been industrially unavailable so far.

It is another object of the invention to provide a novel process for industrially preparing the aromatic polyimide honeycomb core.

The present invention provides a honeycomb strucuture of an aromatic polyimide comprising a plurality of aromatic polyimide sheets wherein adjoining two aromatic polyimide sheets are adhered to each other with a heat resistant adhesive at adhesive regions arranged between the two sheets at equal intervals and the adhesive regions on one side of any aromatic polyimide sheet are located at positions shifted from positions of adhesive regions arranged on another side of said sheet and wherein the aromatic polyimide sheets are extended in the direction vertical to the plane of the polyimide sheets to form a honeycomb structure.

The aromatic polyimide honeycomb core of the invention is lightweight and has high mechanical strength and high heat resistance. Further, the honeycomb core shows high radiation resistance. This is especially preferably when the honeycomb is used in aerospace.

DETAILED DESCRIPTION OF THE INVENTION

Figure 1:
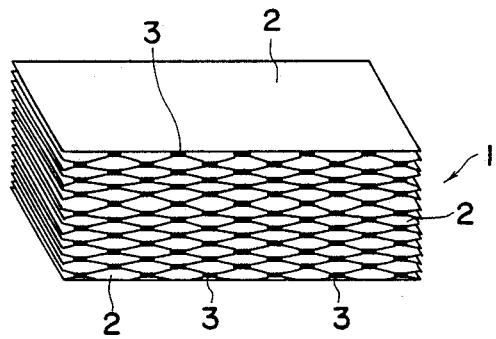
FIG. 1 is a perspective view illustrating an example of the composite (i.e., laminate) which is formed using aromatic polyimide sheets and a heat-resistant adhesive according to the invention.

The aromatic polyimide sheet (including an aromatic polyimide film) employable in the present invention can be made of any kind of aromatic polyimide. However, the aromatic polyimide sheet employed in the invention preferably has a second-order transition temperature in the range of 250° to 400° C., preferably in the range of 260° to 380° C. The second-order transition temperature of the aromatic polyimide sheet can be measured by a dynamic viscoelasticity-measuring method for measuring dynamic viscoelasticity using a mechanical spectrometer (e.g., mechanical spectrometer produced by Leometrix Co., Ltd.).

The aromatic polyimide sheet of the invention preferably has a tensile elongation of not less than 120%, more preferably in the range of 130 to 300%, when measured in tensile test at 100° C., and a thickness of 5 to 5,000 μm, preferably 10 to 3,000 μm, more preferably 20 to 2,000 μm. Further, the aromatic polyimide sheet preferably is a sheet of an optional size which is cut from a continuous sheet material (width: approx. 1-50 mm, preferably approx. 2-40 mm) having smooth surface or a substantially continuous sheet material having smooth surface.

The aromatic polyimide sheet having the specific second-order transition temperature can be prepared as follows.

An aromatic tetracarboxylic acid or its derivative is caused to react with an aromatic diamine in an organic polar solvent such as an amide-type solvent or a phenol-type solvent to produce a solvent-soluble polyamic acid or polyimide in the reaction liquid through polymerization, so as to obtain a polymer solution containing the polyamic acid or polyimide homogeneously dissolved in the solvent. The polymer solution can be used as a film-forming dope liquid to form a film or a sheet according to a known solution-casting method, etc., and the film or sheet is finally subjected to heat treatment.

Examples of the employable aromatic tetracarboxylic acid components employable in the preparation of the polymer solution include 2,3,3',4'- or 3,3',4,4'-biphenyltetracarboxylic acid, 3,3',4,4'-benzophenonetetracarboxylic acid, bis(3,4-carboxyphenyl)methane, 2,2-bis(3,4-carboxyphenyl)propane, dianhydrides thereof, esters thereof, salts thereof, and mixtures of those compounds.

The aromatic polyimide sheet employed in the invention is preferably an aromatic polyimide sheet of biphenyltetracarboxylic acid-type produced from a polymer solution which is prepared through a polymerization reaction using an aromatic tetracarboxylic acid or its derivative mainly containing a biphenyltetracarboxylic acid or its derivative such as 3,3',4,4'-biphenyltetracarboxylic dianhydride (preferably not less than 60 mole %, more preferably not less than 70 mole %, based on the whole amount of all acid components). The thus produced aromatic polyimide sheet exhibits the desirable aforementioned second-order transition temperature and facillitates the various stages of the process for the preparation a honeycomb core such as film-forming stage or honeycomb structure-forming stage. Moreover, the polyimide sheet is also preferred from the viewpoints of heat resistance, radiation resistance, mechanical strength, etc.

The aforementioned aromatic tetracarboxylic acid or its derivative mainly containing biphenyltetracarboxylic acid or its derivative may further contain pyromellitic acid or its dianhydride as well as other aromatic tetracarboxylic acids and their derivatives.

The aromatic diamine preferably contains an aromatic diamine compound having at least two benzene rings (particularly 2–5 benzene rings) as a host component. Examples of such aromatic diamine compounds include diphenylether diamine compounds such as 4,4'-diaminodiphenylether, 3,4'-diaminodiphenylether and 3,3'-diaminodiphenylether; diphenylsulfone diamine compounds such as 4,4'-diaminodiphenylsulfone and 3,4'-diaminodiphenylsulfone; diphenylmethane diamine compounds such as 4,4'-diaminodiphenylmethane, 3,4'-diaminodiphenylmethane and 3,3'-diaminodiphenylmethane; and other aromatic diamine compounds such as 1,4-bis(4-aminophenoxy)benzene, o-tolidine and o-tolidinesulfone.

As the aromatic diamine, a phenylene diamine such as 1,4-diaminobenzene (p-phenylenediamine), 1,3-diaminobenzene or 1,2-diaminobenzene can be employed singly or in combination with the above-mentioned aromatic diamine compound having at least two benzene rings.

The aromatic polyimide sheet most favorably employed in the invention can be prepared, for example, by the following process.

An aromatic tetracarboxylic acid or its derivative containing a biphenyltetracarboxylic acid or its derivative in an amount of not less than 80 mole % and an aromatic diamine having two or more benzene rings such as diaminodiphenylether, diaminodiphenylmethane or diaminodiphenylsulfone are polymerized with each other in an organic polar solvent at an appropriate temperature to produce a high-molecular weight solvent-soluble polymer (aromatic polyamic acid of biphenyltetracarboxylic acid type or aromatic polyimide thereof) in the reaction liquid, so as to obtain a polymer solution having a polymer concentration of approx. 5 to 30 wt. %. The polymer solution (dope liquid) is cast on a smooth surface of a support such as a metallic belt and a metallic drum to form a thin film of the polymer solution on the support (solution casting). Then, the thin film is heated at a temperature of approx. 50° to 300° C. to remove the organic polar solvent from the thin film through evaporation. If necessary, the polyamic acid is subjected to an imidation reaction. Further if necessary, the obtained thin film is again heated to a temperature of 300° to 600° C. to cure the film. Thus, an aromatic polyimide sheet is obtained.

Examples of the organic polar solvents employable for the preparation of a polyamic acid solution for the dope liquid used in the preparation of the aromatic polyimide sheet include amide solvents such as N-methyl-2-pyrrolidone, dimethylformamide, diethylformamide, dimethylacetamide, diethylacetamide and dimethylsulfoamide.

Examples of the organic polar solvents employable for preparing a polyimide solution (dope liquid) used in the preparation of the aromatic polyimide sheet include phenol solvents such as phenol, cresol and halogenated phenol (e.g., p-chlorophenol).

In the present invention, the aromatic polyimide or the aromatic polyamic acid preferably has a logarithmic viscosity ranging from 0.5 to 7.0 when measured under the conditions of temperature of 50° C., concentration of 0.5 g/100 ml-solvent and a solvent of p-chlorophenol or N-methyl-2-pyrrolidone.

The heat-resistant adhesive employed for combining the aromatic polyimide sheets may be a thermosetting adhesive which is capable of keeping the adhesion between the above-mentioned aromatic polyimide sheets at a temperature of not lower than the second-order transition temperature of the aromatic polyimide.

Examples of the heat-resistant adhesives include heat-resistant epoxy adhesives, heat-resistant polyimide adhesives and heat-resistant polybenzoimidazole adhesives. Preferred is an aromatic imide oligomer having an unsaturated group as a terminal group which is obtained by a reaction of an aromatic tetracarboxylic acid, an aromatic diamine and a monoamine compound having an unsaturated group (or a monocarboxylic acid compound), as described in U.S. patent application No. 236,000 (filed on August 24, 1988).

The above-mentioned aromatic imide oligomer preferably has a melting point of not higher than 270° C., more preferably not higher than 250° C. Further, the imide oligomer preferably has a glass transition temperature (Tg) of a temperature higher than the second-order transition temperature of the aromatic polyimide by approx. 5° C., more preferably higher than that by 10° C., or a temperature in the range of approx. 290° to 450° C., more preferably in the range of 300° to 400° C., when measured on the resulting adhesive layer formed after combining the polyimide sheets under heating. The aromatic imide oligomer having such physical property can maintain high adhesion between the polyimide sheets in a subsequent stage (described later) for extending a laminate at an elevated temperature.

The terminal-modified imide oligomers which are preferably employable as adhesives are classified into two groups: one terminal-modified imide oligomer originating from 2,3,3',4'-biphenyltetracarboxylic acid or its derivative such as its acid dianhydride, namely, asymmetric type compound, and another terminal-modified imide oligomer originating from 3,3,4,4'-biphenyltetracarboxylic acid or its derivative such as its acid dianhydride, namely, symmetric type compound.

In the first place, the former imide oligomer originating from the asymmetric type compound is described.

The terminal-modified imide oligomer of the invention is an imide oligomer obtained by reacting 2,3,3',4'-biphenyltetracarboxylic acid or its derivative, a diamine compound, and an unsaturated dicarboxylic acid or its derivative and/or an unsaturated monoamine in an organic solvent in such a manner that the total number of acid anhydride groups or pairs of neighbouring acid groups (including its esters, etc.) of all components are essentially equal to the total number of amino groups of all components, and has an acetylenic or ethylenic unsaturated terminal group (i.e., end group) which is polymerizable in addition reaction and a number of imide bonds inside (in main chain) thereof. Further, the terminal-modified imide oligomer preferably has a logarithmic viscosity of not more than 1.0, more preferably in the range of approx. 0.01 to 0.8, most preferably in the range of approx. 0.03 to 0.7, that is, the imide oligomer preferably has a relatively low molecular weight. The melting point of the terminal-modified imide oligomer is in the range of 50° to 300° C., preferably in the range of 60° to 260° C., and the imide oligomer is in the solid (particulate) state at room temperature (20° C.).

Examples of the aforementioned 2,3,3',4'-biphenyltetracarboxylic acid and its derivative include 2,3,3'4'-biphenyltetracarboxylic acid, 2,3,3',4'-biphenyltetracarboxylic dianhydride (a-BPDA), and their derivatives such as lower alcohol esters thereof and salts thereof. Particularly preferred is 2,3,3',4'-biphenyltetracarboxylic dianhydride.

In the aromatic tetracarboxylic acid or its derivative, at least 50 molar %, preferably at least 70 molar %, more preferably at least 75 molar %, of 2,3,3',4'-biphenyltetracarboxylic acid ot is derivative is contained. In other words, the above-mentioned 2,3,3',4'-biphenyltetracarboxylic acid or its derivative can be partially (not more than 50 molar %, preferably not more than 30 molar %, more preferably not more than 25 molar %) substituted by other aromatic tetracarboxylic acids or their derivatives such as 3,3',4,4'-biphenyltetracarboxylic dianhydride (s-BPDA), 3,3',4,4'-benzophenonetetracarboxylic dianhydride (BTDA), pyromellitic dianhydride (PMDA), 2,2-bis(3,4-dicarboxyphenyl)propane dianhydride, bis(3,4-dicarboxyphenyl)methane dianhydride, bis(3,4-dicarboxyphenyl)ether dianhydride, bis(3,4-dicarboxyphenyl)-thioether dianhydride, bid(3,4-dicarboxyphenyl)phosphine dianhydride and bis(3,4-dicarboxyphenyl)sulfone dianhydride, or aliphatic tetracarboxylic acids such as butanetetracarboxylic dianhydride.

Examples of the aforementioned diamine compounds are as follows:

(i) benzene diamines (phenylenediamines) such as 1,4-diaminobenzene, 1,3-diaminobenzene (m-phenylenediamine: MPD), 1,2-diaminobenzene, 2,6-diethyl-1,3-diaminobenzene and 4,6-diethyl-2-methyl-1,3-diaminobenzene;

(ii) toluene diamines such as 3,5-diethyltoluene-2,4-diamine (2,4-DETDA) and 3,5-diethyltoluene-2,6-diamine (2,6-DETDA);

(iii) xylylene diamines such as m-xylylenediamine and p-xylylenediamine;

(iv) diphenyl(thio)ether diamines such as 4,4'-diaminodiphenyl ether (DADE), 3,4'-diaminodiphenyl ether, 3,3'-diaminodipheyl ether and 4,4'-diaminodiphenyl thioether;

(v) benzophenone diamines such as 3,3'-diaminobenzophenone and 4,4'-diaminobenzophenone;

(vi) diphenylphosphine diamines such as 3,3'-diaminodiphenylphosphine and 4,4'-diaminodiphenylphosphine;

(vii) diphenylsulfide diamines such as 3,3'-diaminodiphenylsulfide and 4,4'-diaminodiphenylsulfide;

(viii) diphenylsulfone diamines such as 3,3-diaminodiphenylsulfone (3,3'-DDS) and 4,4'-diaminodiphenylsulfone;

(ix) diphenylmethane diamines such as 3,3'-diaminodiphenylmethane, 4,4'-diaminodiphenylmethane (DADM), bis(2,6-diethyl-4-aminophenyl)methane, 4,4'-methylene-bis(2,6-diethylaniline) (M-DEA), bis(2-ethyl-6-methyl-4-aminophenyl)methane and 4,4'-methylene-bis(2-ethyl-6-methylaniline) (M-MEA);

(x) bis(phenyl)propane diamines such as 2,2-bis(3-aminophenyl)propane, 2,2-bis(4-aminophenyl)propane, 2,2-bis(3-chloro-4-aminophenyl)propane and 2,2-bis(3-amino-4-hydroxyphenyl)hexafluoropropane (BHFP);

(xi) bis(phenoxy)diphenylsufone diamines such as 4,4'-bis(4-aminophenoxy)diphenylsulfone, bis[4-(4-aminophenoxy)phenyl]sulfone (4-BAPS), 4,4'-bis(3-aminophenoxy)diphenylsulfone and bis[4-(3-aminophenoxy)phenyl]sulfone (3-BAPS);

(xii) benzidines such as benzidine and 3,3'-dimethylbenzidine (o-TN);

(xiii) bis(phenoxy)benzene diamines such as 1,3-bis(4-aminophenoxy)benzene (TPE-R), 1,3-bis(3-aminophenoxy)benzene, 1,4-bis(4-aminophenoxy)benzene (TPE-Q) and 1,3-bis(4-aminophenoxy)benzene;

(xiv) bis(phenoxy)propane diamines such as 2,2-bis(4-aminophenoxy)propane and 2,2-bis(3-aminophenoxy)propane;

(xv) bis[(phenoxy)phenyl]propane diamines such as 2,2-bis[4-(4-aminophenoxy)phenyl]propane (BAPP) and 2,2-bis[4'(4''-aminophenoxy)phenyl]hexafluoropropane (BAFP); and (xvi) polyethylene glycol diamines.

The above-mentioned diamine compounds can be used singly or in the form of a mixture thereof.

The aforementioned unsaturated dicarboxylic acid and its derivative simultaneously have in the molecule: (i) an unsaturated group (cross-linking group) such as a carbon-carbon double bond (i.e., ethylene group) or a carbon-carbon triple bond (i.e., acetylene group), and (ii) a pair of carboxyl groups (i.e., dicarboxyl group) linking an adjacent carbon atom or an acid monoanhydride group thereof; and further they are: (iii) reactive organic compounds capable of forming an imide bond upon reaction with a compound having an amino group.

Preferred examples of the unsaturated dicarboxylic acid and its derivatives are as follows: (a) maleic anhydride or its derivatives such as dimethylmaleic anhydride, diisopropylmaleic anhydride and dichloromaleic anhydride;

(b) tetrahydrophthalic anhydride and its derivatives such as methyltetrahydrophthalic anhydride; and (c) nadic anhydride (NA) or its derivatives such as methylnadic anhydride, oxynadic anhydride, methyloxynadic anhydride, dimethyloxynadic anhydride, ethylnadic anhydride and hexachloronadic anhydride.

The above-mentioned unsaturated dicarboxylic acid and its derivative can be used singly or in combination in the invention.

The aforementioned unsaturated monoamine compound is a reactive unsaturated monoamine which simultaneously has the above-mentioned unsaturated group and a monoamino group (primary amino group) and forms an imide bond upon reaction with a pair of adjacent carboxyl groups.

Examples of the unsaturated monoamines are as follows:

(a) aliphatic monoamine compounds such as propargylamine (PA), 3-aminobutyne, 4-aminobutyne, 5-aminopentyne, 6-aminohexyne, 7-aminoheptyne, 4-amino-3-methylbutyne, 4-aminopentyne and allylamine (AA); and (b) aromatic monoamine compounds such as m-aminostyrene, p-aminostyrene, m-amino-α-methylstyrene, 1-isopropenyl-3-(2-aminoisopropyl)benzene, 1-isopropenyl-4-(2-aminoisopropyl)benzene, 3-aminophenylacetylene and 4-aminophenylacetylene.

The above-mentioned unsaturated monoamine compounds can be employed singly or in combination in the invention.

Examples of the organic polar solvents employed for preparing the imide oligomer include amide solvents such as N,N-dimethylformamide, N,N-dimethylacetamide, N-methyl-2-pyrrolidone (NMP) and N-methylcaprolactam; solvents containing sulfur atom such as dimethylsulfoxide, hexamethylphosphoramide, dimethylsulfone, tetramethylenesulfone and dimethyltetramethylenesulfone; phenol solvents such as cresol and phenol; and other solvents such as pyridine, ethylene glycol and tetramethyl urea.

The terminal-modified imide oligomer can be prepared, for example, by the following process. The aforementioned 2,3,3',4'-biphenyltetracarboxylic acid or its derivative (e.g., acid dianhydride thereof), diamine compound (preferably aromatic diamine compound), unsaturated dicarboxylic acid or its derivative (e.g., acid dianhydride thereof) and/or unsaturated monoamine are used in such a manner that the whole amount of acid anhydride groups (or adjacent dicarboxylic acids) of all components essentially equals the whole amount of amino groups of all components. Each component is caused to react with each other in the aforementioned organic polar solvent at a temperature of approx. not higher than 100° C., preferably not higher than 80° C., to produce "an oligomer having amide-acid bond". Then, the amide-acid oligomer (i.e., amic acid oligomer) is subjected to a dehydration-ring closure reaction in the presence of an imidating agent at a low temperature of approx. 0° to 140° C. or by heating at a high temperature of 140° to 250° C., to produce an imide oligomer having an unsaturated group (specifically ethylene or acetylne) at the terminal which is capable of undergoing addition-polymerization reaction.

The terminal-modified imide oligomer prepared as above can be used in the form of a powdery product. For obtaining the powdery imide oligomer, the reaction liquid may be poured into water, and the terminal-modified imide oligomer is isolated from the resulting mixture in the form of a powdery product. The powdery imide oligomer can be utilized, if desired, after it is dissolved in an organic polar solvent. Otherwise, the terminal-modified imide oligomer can be used in the form of a solution composition containing the oligomer without isolating the oligomer from the reaction liquid. For example, the above-obtained reaction liquid per se may be used, or the reaction liquid may be concentrated or diluted.

In the second place, the terminal-modified imide oligomer originating from the symmetric type compound is described.

The terminal-modified imide oligomer of the invention is an imide oligomer obtained by reacting 3,3',4,4'-biphenyltetracarboxylic acid or its derivative, a diamine compound, and an unsaturated dicarboxylic acids or its derivative and/or an unsaturated monoamine in an organic solvent in such a manner that the total number of acid anhydride groups or pairs of neighbouring acid groups (including its esters, etc.) of all components are essentially equal to the total number of amino groups of all components, and the oligomer has an acetylene or ethylene unsaturated terminal group (i.e., end group) which is addition polymerizable and a number of imide bonds within the main chain. Further, the terminal-modified imide oligomer preferably has a logarithmic viscosity of not more than 1.0, preferably in the range of approx. 0.01 to 0.8, more preferably in the range of approx. 0.03 to 0.7, that is, the imide oligomer preferably has a relatively low molecular weight. The melting point of the terminal-modified imide oligomer preferably is in the range of 50° to 300° C., more preferably in the range of 60° to 260° C., and the imide oligomer is in the solid (e.g., powdery) state at room temperature (20° C.).

Examples of the aforementioned 3,3',4,4'-biphenyltetracarboxylic acid and its derivative include 3,3',4,4'-biphenyltetracarboxylic acid, 3,3',4,4'-biphenyltetracarboxylic dianhydride (s-BPDA), and their derivatives such as lower alcohol esters thereof and salts thereof. Particularly preferred is 3,3',4,4'-biphenyltetracarboxylic dianhydride.

In the aromatic tetracarboxylic acid or its derivative, at least 50 molar %, preferably at least 70 molar %, more preferably at least 80 molar %, most preferably at least 90 molar %, of 3,3',4,4'-biphenyltetracarboxylic acid ot is derivative is contained. In other words, the above-mentioned 3,3',4,4'-biphenyltetracarboxylic acid or its derivative can be partially (not more than 50 molar %, preferably not more than 30 molar %, more preferably not more than 20 molar %, most preferably not more than 10 molar %) substituted by other aromatic tetracarboxylic acids or their derivatives such as 2,3,3',4'-biphenyltetracarboxylic dianhydride (s-BPDA), 3,3',4,4'-benzophenonetetracarboxylic dianhydride (BTDA), pyromellitic dianhydride (PMDA), 2,2-bis(3,4-dicarboxyphenyl)propane dianhydride, bis(3,4-dicarboxyphenyl)methane dianhydride, bis(3,4-dicarboxyphenyl)ether dianhydride, bis(3,4-dicarboxyphenyl)thioether dianhydride, bid(3,4-dicarboxyphenyl)phosphine dianhydride and bis(3,4-dicarboxyphenyl)sulfone dianhydride, or aliphatic tetracarboxylic acids such as butanetetracarboxylic dianhydride.

The diamine compound to be employed in combination with the 3,3',4,4'-biphenyltetracarboxylic acid or its derivative is selected from the following diamines: trialkylbenzene diamines, bis(phenoxy)benzene diamines, diphenylalkane diamines, bis(phenoxy)propane diamines, bis[(phenoxy)phenyl]propane diamines, diphenylsulfone diamines and bis(phenoxy)diphenylsulfone diamines. Examples of the trialkylbenzene diamines include the aforementioned toluene diamines (e.g., 3,5-diethyltoluene-2,4-diamine and 3,5-diethyltoluene-2,6-diamine) and 4,6-diethyl-2-methyl-1,3-diaminebenzene. Examples of the diphenylalkane diamines include the aforementioned diphenylmethane diamines and bis(phenyl)propane diamines. Examples of other diamines are described hereinbefore.

The above-mentioned diamine compounds can be used singly or in the form of a mixture thereof.

The aforementioned description for the unsaturated dicarboxylic acid and its derivative and the unsaturated monoamine compound for the imide oligomer from the asymmetric type compound is appropriate in the case of the imide oligomer from the symmetric type compound.

The aforementioned organic polar solvents can be also employed for the preparation of the imide oligomer from the symmetric type compound and for the preparation of the solution composition.

The terminal-modified imide oligomer from the symmetric type compound can be prepared in the same manner as that described for the preparation of the imide oligomer from the asymmetric type compound.

The process of the preparation of a honeycomb structure of the invention will be described below.

As shown in FIG. 1, the heat-resistant adhesive is applied in order onto a plurality of the aforementioned aromatic polyimide sheets 2, with laminating the sheets one upon another, in such a manner that the adhesive is arranged at regions to be set apart at regular intervals on the same sides of the polyimide sheets 2; and that the adhesive is arranged at the positions shifting (deviating) from those on the neighboring surface at equal intervals, to combine the polyimide sheets to each other.

Thus, laminate 1 in which aromatic polyimide sheets are combined at a number of adhesive regions 3 is obtained.

If necessary, the laminate may be heated at a temperature of 50° to 270° C., preferably 60° to 250° C.

Figure 2:
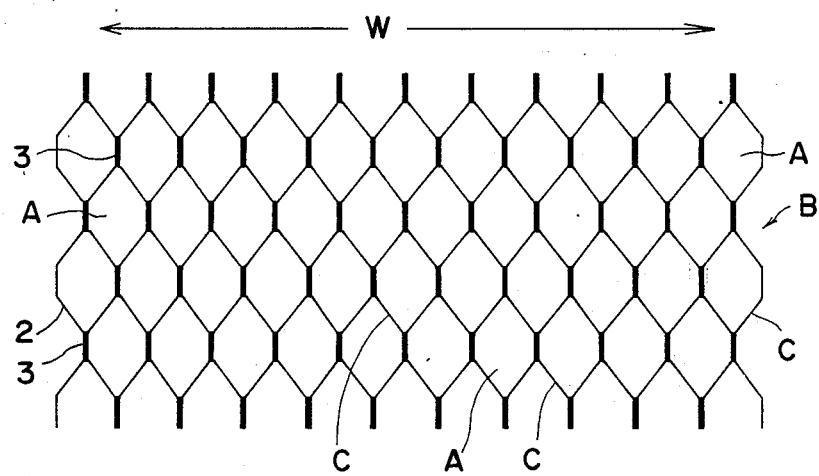
FIG. 2 is a plan view illustrating a structure of the honeycomb core of an aromatic polyimide according to the invention.

As shown in FIG. 2, the length or width of the adhesive region can be optionally selected from those which form at least one side C of a honeycomb structure A of polygonal form (e.g., hexagon) of the resulting honeycomb core B according to the invention. For example, the length or width thereof is approx. 1 to 50 mm, preferably approx. 3 to 30 mm. The interval between the adhesive regions generally is approx. three times as much as the length or width of the adhesive region in the case of forming a honeycomb structure of a hexagon or similar structure.

In the preparation of the laminate, the adhesion of the aromatic polyimide sheets by the adhesive may be carried out by heating each sheet as it is adhered. Otherwise, after applying the adhesive onto the sheets and laminating all of the sheets, the resulting laminate may be heated at once.

When the thus obtained laminate is in continuous form, the laminate is generally cut in the width direction to give a desired shape. If necessary, the laminate may be cut in the direction of crossing the adhesive region (i.e., longitudinal direction of the laminate). The cutting can be carried out using a conventional cutting device such as a bandsaw.

The laminate prepared as above is then extended in the direction vertical to the plane of the laminate (W direction in FIG. 2) at a temperature, for instance, not lower than the aforementioned second-order transition temperature, preferably a temperature higher than the second-order transition temperature by approx. 1° to 20° C. under application of an appropriate extension force, to form a honeycomb structure A as shown in FIG. 2. In the invention, the honeycomb structure obtained by extending the laminate at an elevated temperature is then preferably cooled to room temperature keeping the same structure, to obtain a honeycomb core of aromatic polyimide. The cooling of the honeycomb structure can be conducted by any known method under conventional conditions.

The example of the present invention is given below.

EXAMPLE 1

An aromatic polyimide sheet of belt form (thickness: 50 μm, width: 2 cm, second-order transition temperature measured by dynamic viscoelasticity measuring method: 285° C., tensile elongation by tensile test at 100° C.: 130%, tensile elongation at the second-order transition temperature: 250%) was prepared from a p-chlorophenol solution of aromatic polyimide (logarithmic viscosity: 3,4, prepared from 3,3',4,4'-biphenyltetracarboxylic dianhydride (s-BPDA) and 4,4'-diaminodiphenylether (DADE)) according to a solution casting method.

Independently, 2,3,3',4'-biphenyltetracarboxylic dianhydride (a-BPDA) was caused to react with 4,4'-diaminodiphenylether (DADE) to produce "terminal-modified imide oligomer having an unsaturated terminal group" (logarithmic viscosity at 25° C.: 0.6, melting point: 203° C., Tg of heat-cured product: 342° C.). The terminal-modified imide oligomer was dissolved in N-methyl-2-pyrrolidone (NMP) to give an adhesive.

The above-prepared aromatic polyimide sheets (20 sheets, each length: 32 cm) were combined to each other by applying the above-obtained heat-resistant imide oligomer adhesive onto the polyimide sheets to laminate those sheets one upon another. The resulting laminate was dried at 80° C., and then heated to 260° C. to form a final laminate in which aromatic polyimide sheets were combined to each other at a number of the adhesive regions. Thereafter, the laminate was extended in the lamination direction at 295° C. to form a honeycomb structure, and finally the honeycomb structure was cooled to room temperature, to prepare a honeycomb core of aromatic polyimide.

The application of the adhesive onto the aromatic polyimide sheets was conducted in such a manner that the adhesive regions on the polyimide sheets are arranged at equal intervals of approx. 20 mm and the length of each adhesive region is 7 mm, and further the adhesive regions are arranged to shift from those on the neighboring side at equal intervals by a half of the above-mentioned interval.

The aromatic polyimide honeycomb core obtained as above had a compression strength of not less than 5.5 kg/cm² in a strength test at 25° C.

As for the compression strength, not less than 80% of this primary value (5.5 kg/cm²) was kept even under heating the honeycomb core to 200° C., and further not less than 90% of the primary value was kept even under cooling the honeycomb core to −60° C.

We claim:

1. A honeycomb structure of aromatic polyimide comprising plural aromatic polyimide sheets wherein adjoining sheets of an aromatic polyimide prepared from an aromatic tetracarboxylic acid or its derivative and an aromatic diamine are combined to each other with a heat resistant adhesive at adhesive regions arranged between the two sheets at equal intervals and the adhesive regions on one side of any aromatic polyimide sheet are located at positions shifted from positions of adhesive regions arranged on the opposite side of said sheet and wherein the aromatic polyimide sheets are extended in the direction vertical to the plane of the polyimide sheets to form a honeycomb structure.

2. The honeycomb structure as claimed in claim 1, wherein said adhesive is an aromatic imide oligomer having an unsaturated group as a terminal group which is obtained by a reaction of an aromatic tetracarboxylic acid, an aromatic diamine and a monoamine compound having an unsaturated group or a monocarboxylic acid compound.

3. The honeycomb structure as claimed in claim 1, wherein said adhesive is a terminal-modified imide oligomer produced by reacting an aromatic tetracarboxylic acid or its derivative containing at least 50 molar % of 2,3,3',4'-biphenyltetracarboxylic acid or its derivative, a diamine compound, and an unsaturated dicarboxylic acid or its derivative or an unsaturated monoamine in an organic solvent; said oligomer having an unsaturated group as a terminal group and an imide bond within the oligomer; and said oligomer having a logarithmic viscosity of not more than 1.0, said logarithmic viscosity being measured under conditions of a concentration of 0.5 g/100 ml N-methyl-2-pyrrolidone and temperature of 30° C., and has a melting point of 50° to 300° C.

4. The honeycomb structure as claimed in claim 1, wherein said adhesive is a terminal-modified imide oligomer having been produced by reacting an aromatic tetracarboxylic acid or its derivative containing at least 50 molar % of 3,3',4,4'-biphenyltetracarboxylic acid or its derivative, a diamine compound, and an unsaturated dicarboxylic acid or its derivative or an unsaturated monoamine in an organic solvent; said diamine compound having been selected from the group consisting of trialkylbenzene diamines, bis(phenoxy)benzene diamines, diphenylalkane diamines, bis(phenoxy)propane diamines, bis[(phenoxy)phenyl]propane diamines, diphenylsulfone diamines and bis(phenoxy)diphenylsulfone diamines; said oligomer having an unsaturated group as a terminal group and an imide bond inside of the oligomer; and said oligomer having a logarithmic viscosity of not more than 1.0, said logarithmic viscosity being measured under the conditions of concentration of 0.5 g/100 ml-N-methyl-2-pyrrolidone and temperature of 30° C., and has a melting point of 50° to 300° C.

5. The honeycomb structure as claimed in claim 1, wherein said aromatic polyimide sheet has a second-order transition temperature in the range of 250° to 400° C.

6. The honeycomb structure as claimed in claim 1, wherein the aromatic polyimide is a resin which is prepared by reaction of 2,3,3',4'- or 3,3',4,4'-biphenyltetracarboxylic acid, its dianhydride, its ester or its salt with an aromatic diamine.

7. A process for preparing a honeycomb structure of aromatic polyimide comprising the steps of:
 preparing a composite of laminated plural aromatic polyimide sheets wherein adjoining aromatic polyimide sheets are combined to each other with a heat-resistant adhesive at adhesive regions arranged between the two sheets at equal intervals and the adhesive regions on one side of any aromatic polyimide sheet are located at positions shifted from positions of adhesive regions arranged on the opposite side of said sheet and
 extending the combined aromatic polyimide sheets in the direction vertical to the plane of the polyimide sheets to form a honeycomb structure.

8. The process for preparing a honeycomb structure as claimed in claim 7, wherein the adhesive is an aromatic imide oligomer having an unsaturated group as a terminal group which is obtained by a reaction of an aromatic tetracarboxylic acid, an aromatic diamine and a monoamine compound having an unsaturated group or a monocarboxylic acid compound.

9. The process for preparing a honeycomb structure as claimed in claim 7, wherein said aromatic polyimide sheet has a second-order transition temperature in the range of 250° to 400° C.

* * * * *